US011863526B2

(12) United States Patent
Kaidi

(10) Patent No.: US 11,863,526 B2
(45) Date of Patent: Jan. 2, 2024

(54) DYNAMICALLY ROUTING NETWORK TRAFFIC BETWEEN DEFENSE LAYERS

(71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 218 days.

(21) Appl. No.: 17/174,643

(22) Filed: Feb. 12, 2021

(65) Prior Publication Data

US 2022/0263799 A1 Aug. 18, 2022

(51) Int. Cl.
*H04L 9/40* (2022.01)
(52) U.S. Cl.
CPC ...... *H04L 63/0236* (2013.01); *H04L 63/1416* (2013.01)
(58) Field of Classification Search
CPC ............. H04L 63/0236; H04L 63/1416; H04L 63/101
See application file for complete search history.

(56) References Cited

U.S. PATENT DOCUMENTS

| 2015/0026800 | A1* | 1/2015 | Jain | H04L 63/1416 726/22 |
|---|---|---|---|---|
| 2017/0063920 | A1* | 3/2017 | Thomas | H04L 63/0272 |
| 2017/0279685 | A1* | 9/2017 | Mota | H04L 41/046 |
| 2018/0359279 | A1* | 12/2018 | Knight | H04L 63/1458 |
| 2019/0182558 | A1* | 6/2019 | Stern | H04N 21/4542 |
| 2021/0176167 | A1* | 6/2021 | Shivananda | H04L 45/72 |
| 2021/0194853 | A1* | 6/2021 | Xiao | H04L 63/0281 |
| 2021/0226967 | A1* | 7/2021 | Shin | H04L 63/0245 |
| 2021/0288996 | A1* | 9/2021 | Maeda | H04L 47/788 |
| 2021/0344714 | A1* | 11/2021 | Yang | H04L 63/1491 |
| 2022/0337621 | A1* | 10/2022 | Peters | G06F 9/547 |

OTHER PUBLICATIONS

Varonis, Mitre ATT&CK Framework: Everything You Need to Know; https://www.varonis.com/blog/mitre-attck-framework-complete-guide/; 2021, 15 pages. [Retrieved Feb. 12, 2021].
Varonis, What is the Cyber Kill Chain and How to Use it Effectively; https://www.varonis.com/blog/cyber-kill-chain/; 2021, 10 pages. [Retreived 2/1221].

* cited by examiner

*Primary Examiner* — Daniel B Potratz
*Assistant Examiner* — Matthias Habtegeorgis
(74) *Attorney, Agent, or Firm* — Kowert, Hood, Munyon, Rankin & Goetzel, P.C.; Dean M. Munyon

(57) ABSTRACT

Techniques are disclosed relating to dynamically routing network traffic between defense layers. For example, in various embodiments, a server system may implement a traffic distribution module that is operable to distribute a particular type of network traffic across multiple different defense layers. The traffic distribution module may receive a first set of requests that have been identified as being indicative of that particular type of network traffic and then route this first set of requests across the different defense layers based on a set of distribution weightage values. In various embodiments, the disclosed techniques include determining an updated set of distribution weightage values based on an effectiveness of the defense layers in mitigating the particular type of network traffic. In such embodiments, the traffic distribution module may then use this updated set of distribution weightage values to route a second set of network traffic across the various defense layers.

20 Claims, 8 Drawing Sheets

600

Implement a traffic distribution module that is operable to distribute a particular type of network traffic across a plurality of different defense layers, where the plurality of different defense layers include:
-a first defense layer that is operable to perform a first set of one or more defensive operations; and
-a second defense layer that is operable to perform a second set of one or more defensive operations
602

↓

Receive, by the traffic distribution module, a first plurality of requests that have been identified as indicative of the particular type of network traffic
604

↓

Route, by the traffic distribution module, the first plurality of requests across the plurality of different defense layers, wherein the routing is performed based on a set of distribution weightage values
606

↓

Determine an updated set of distribution weightage values based on an effectiveness of the plurality of different defense layers in mitigating the particular type of network traffic
608

↓

Route, by the traffic distribution module, a second plurality of requests across the plurality of different defense layers based on the updated set of distribution weightage values
610

*FIG. 6*

DYNAMICALLY ROUTING NETWORK TRAFFIC BETWEEN DEFENSE LAYERS

BACKGROUND

Technical Field

This disclosure relates generally to computer system security, and more particularly to dynamically routing network traffic between different defense layers.

Description of the Related Art

Server systems may utilize various techniques to detect and mitigate different types of network attacks. For example, a server system may be subjected to various types of network attacks (e.g., SQL injection attacks, password spraying attacks, etc.) from malicious users. Accordingly, when a server system receives a request that it deems likely to correspond to a particular type of network attack, the server system may perform a corresponding defensive operation to determine whether that request is malicious and, if so, take an appropriate mitigating action (e.g., denying the request).

In many instances, malicious users will attempt to map a server system's defenses by sending multiple (and, possibly, many) malicious attack attempts to the server system in an effort to glean useful details about the defenses being utilized by the server system. For instance, a malicious user may use the server system's responses to these malicious requests to determine the backend defenses that the server system has put in place, aiding the malicious user's attempts to bypass these defenses. Accordingly, such activities present a significant security concern for the server system.

BRIEF DESCRIPTION OF THE DRAWINGS

FIGS. 5 and 6 are flow diagrams illustrating example methods for dynamically routing network traffic between various defense layers, according to some embodiments.

DETAILED DESCRIPTION

Figure 1:
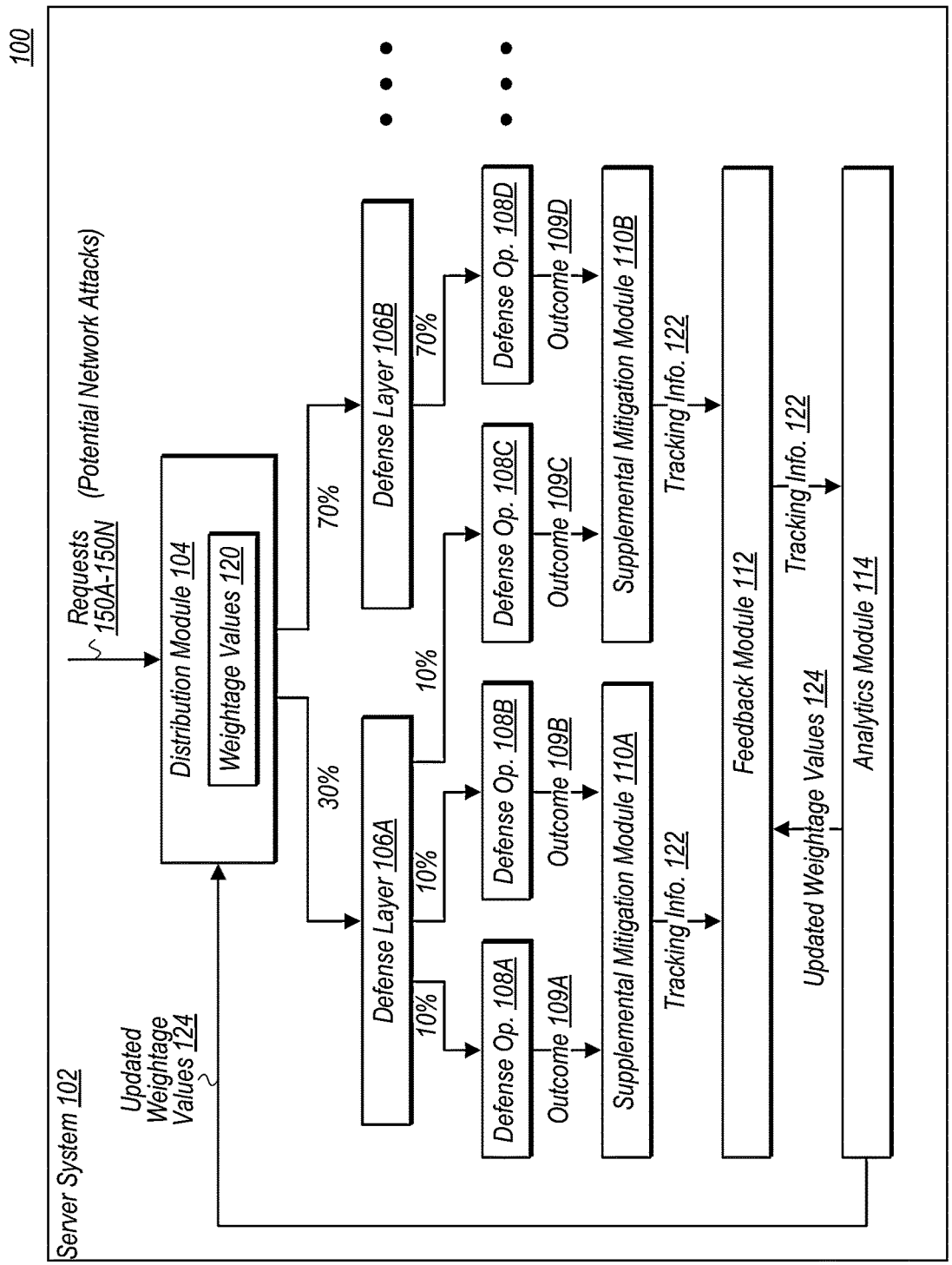
FIG. 1 is a block diagram illustrating an example server system that includes a distribution module, according to some embodiments.

Server systems may utilize various techniques to detect and mitigate different types of network attacks. For example, in providing its services (e.g., web-based services), a server system may be subjected to various types of network attacks (e.g., SQL injection attacks, password spraying attacks, etc.) from malicious users. Accordingly, when a server system receives a request that it deems likely to correspond to a particular type of network attack, the server system may route that request to one or more "defense layers," which, as used herein, refers to a network security mechanism that may implement one or more defensive operations in an effort to determine whether a given request is a network attack and, if so, take an appropriate mitigating action (e.g., denying the request).

Once a request has been identified as potentially corresponding to a particular type of network attack, one common technique in prior systems is to route that request to a single, dedicated defense layer that is believed to be capable of accurately identifying and stopping that particular type of network attack. Such an approach presents various technical shortcomings, however, exposing the server system to increased risks. For example, while a server system's defenses to a particular type of network attack may initially be a "black box," attackers often attempt to guess and map out a server system's defenses by sending multiple (and, possibly, many) malicious attack attempts to the server system in an effort to glean useful details about the defense layers being utilized by the server system. For instance, a malicious user may find code or output snippets to determine the backend defenses that the server system has put in place. As a non-limiting example, in an instance in which the server system uses a web application firewall ("WAF") to prevent a particular type of network attacks, the malicious user may hit the server system with various payloads to determine the WAF blocking signature and, having done so, attempt to find ways to bypass this defense. Accordingly, using prior techniques in which a server system uses static defense layers, malicious users may engage in testing operations to determine the limitations of the defense layer so that these defense mechanisms can be overcome, presenting a significant security concern for the server system.

In various embodiments, however, the disclosed techniques may address these technical problems by dynamically routing network traffic between various defense layers. That is, rather than using a static and single-threaded defensive approach that is predictable to malicious users, the disclosed techniques include dynamically shuffling the distribution of traffic between multiple different defenses, which makes it difficult for an attacker to predict the potential defense that a target system may utilize, and further improves the effectiveness of the server system's defenses as a whole. For example, in some embodiments, the disclosed techniques include using a traffic distribution module that is operable to dynamically distribute network traffic (previously identified as being indicative of a particular type of network attack) between multiple different defense layers based on a set of distribution weightage values. In some such embodiments, each of the different defense layers may utilize one or more (potentially different) defensive operations. In various embodiments, based on outcome information indicative of an effectiveness of the defense layers to which the network traffic was routed, the disclosed techniques may update the set of distribution weightage values, thereby modifying the manner in which the traffic distribution module routes subsequent requests that have been identified as being indicative of the particular type of network attack. In various embodiments, the distribution weightage values may be updated based on a selected optimization goal, such as effectiveness of the defense layers, time-to-mitigation, accuracy, etc.

The disclosed techniques may provide various technical benefits. For example, by dynamically distributing network traffic that is suspected to correspond to a particular type of network attack, multiple different defense layers may be used to handle an attacker's stream of attacks. In such a scenario, the attacker is no longer receiving consistent test results, making the defenses less predictable by the attacker and interfering with the attacker's ability to glean useful information about the server system's defense layers and to figure out potential weaknesses that the attacker may exploit. Additionally, since multiple different defense layers may be utilized simultaneously for the same type of network attack, the disclosed techniques may quickly identify which of these defense layers (and, within a defense layer, the particular defensive operations) are most effective at identifying and preventing the particular type of network attack. This, in turn, may allow the disclosed systems and methods to route more of the network traffic through defense layers (or defensive operations) that are more effective in preventing the particular type of network attack, improving the network security of the server system as a whole.

Referring now to FIG. 1, block diagram 100 depicts an example server system 102 that includes distribution module 104 (also referred to herein as "traffic distribution module 104"), feedback module 112, and analytics module 114. (Note that, although shown as separate elements in FIG. 1, distribution module 104, feedback module 112, and analytics module 114 may be combined in any suitable combination, as desired.) In various embodiments, distribution module 104, feedback module 112, and analytics module 114 are operable to dynamically route network traffic between multiple different defensive layers 106.

For example, as noted above, in the course of providing its service(s), server system 102 may receive, in addition to legitimate requests, requests that are associated with various types of network attacks. In various embodiments, requests 150 that have been identified as potential network attacks are directed to the distribution module 104 so that they may be routed to one of multiple different defense layers 106. As shown in FIG. 1, the disclosed techniques may utilize any suitable number of defense layers 106A-106N to identify and mitigate various types of network attacks. In various embodiments, distribution module 104 is operable to determine the defense layer 106 to which to route the requests 150 that are identified as potential network attacks. For example, in the depicted embodiment, distribution module 104 includes (or has access to) weightage values 120 (also referred to herein as "distribution weightage values 120") that the distribution module 104 may use to determine how to distribute the requests 150 it receives. In the depicted embodiment, for instance, the weightage values 120 specify that, for a particular type of network attack, the distribution module 104 is to route 30% of the requests 150 to defense layer 106A and 70% of the requests 150 to defense layer 106B. Note, however, that this embodiment is depicted merely as one non-limiting example and, as described in more detail below, the weightage values 120 may start with any suitable initial values and may be modified as determined by analytics module 114 so as to improve the ability of the disclosed techniques to identify and mitigate network attacks.

In various embodiments, in addition to determining the defense layer 106 to which a given request 150 is routed, the distribution module 104 may also control (either directly or indirectly) the particular defensive operation(s) 108 that are applied for a given request 150. In the depicted embodiment, for example, defense layer 106A has access to three defensive operations 108A-108C and defense layer 106B has access to one defensive operation 108D. In the current example, from defense layer 106A, 10% of the total requests 150 (associated with a particular type of network attack) are routed to each of defensive operations 108A, 108B, and 108C, while the remaining 70% of the request 150 are routed to defensive operation 108D.

Defense layers 106 and defensive operations 108 are described in more detail below with reference to FIG. 4, according to some non-limiting embodiments. For the purposes of the present discussion, however, note that the defense layers 106 may be any of various suitable network security mechanisms implemented using hardware, software, or both. For example, in some embodiments, a defense layer 106 may be a proxy server (implemented within server system 102 or by a third party), an SSO, an Active Directory ("AD"), an email gateway, a firewall, an intrusion prevention system ("IPS"), etc. Further note that, in various embodiments, each defense layer 106 may implement any suitable number of defensive operations 108, which may be any of various suitable defense operations. For example, in some embodiments, defense operations 108 may include applying WAF signatures, pattern-based blocks, block attempts, rate-limiting, AD password protection, email filtering, signature-based blocks, stateful and stateless packet filtering, custom signatures or custom signature groups or categories, etc.

Additionally, note that, in various embodiments, the particular defense layers 106 and defensive operations 108 to which a given request 150 is routed may depend on the particular type of network attack of which the request 150 is suspected of being. For example, in various embodiments, the disclosed techniques may be used to handle multiple different types of network attacks and, in some such embodiments, the disclosed techniques may dynamically route requests 150 that potentially correspond to multiple different types of network attacks to different defense layers 106 or defensive operations 108 depending on the particular type of network attack with which a given request 150 is potentially associated. For example, in some embodiments, a first subset of defense layers 106 (e.g., defense layers 106A-106D) may be used for a first type of network attack (e.g., SQL injection attacks), a second set of defense layers 106 (e.g., defense layers 106E-106G) may be used for a second type of network attack (e.g., password spraying attacks), etc. Further note that, in some such embodiments, such subsets of defense layers 106 may overlap such that the same defense layer(s) 106 (and, potentially, the same defensive operation(s) 108) are used for multiple different types of network attacks.

In FIG. 1, once the defensive operation 108 has been applied for a given request 150, outcome information 109 is provided to a supplemental mitigation module 110. In various embodiments, the supplemental mitigation module 110 is operable to perform one or more additional mitigation operations (in addition to any mitigation operations that may have been performed as part of the defensive operations 108) for a given request 150. Note that the information included in outcome information 109 may vary depending, for example, on the type of network attack with which the request 150 is associated, the defense layer 106 or defensive operation 108 to which the request 150 was routed, etc. In some embodiments, for example, the outcome information 109 for a given request may specify an outcome of the defensive operation 108 that was applied for the given request 150, indicating whether the request was blocked by the defensive operation 108. In some embodiments, the outcome information 109 may also include a status code, such as an Hypertext Transfer Protocol ("HTTP") response status code (e.g., HTTP 403 ("forbidden")), a custom code for a particular WAF used, a challenge result (e.g., a CAPTCHA challenge result), or any other suitable type of status code.

The mitigation operations performed by supplemental mitigation module 110 (if any) may also vary depending, for example, on the type of potential network attack involved. Non-limiting examples of defensive operations that may be performed by supplemental mitigation module 110 include adding an IP address of the client device from which the request originated to a block list, adding a device fingerprint for the client device to a block list, adding a password to a block list, forcing a password reset, limiting or restricting the user account(s) involved (e.g., customer or employee accounts), adding traffic patterns or components to a block list, setting lockout periods to temporarily suspend services to a particular IP or account, etc. Note that, instead of or in addition to performing an additional mitigation operation, the supplemental mitigation module 110, in some embodiments, is operable to use one or more threat vectors associated with a given request 150 to identify other threat vectors that may not otherwise be detected by the server system 102. This process, according to some non-limiting embodiments, is described in more detail below with reference to FIG. 7. Further note that, in various embodiments, the particular supplemental mitigation operation selected may be designed to mitigate the threat itself, rather than the simply blocking the specific request 150. For example, by adding an IP address (or range of IP addresses) associated with the client device that sent the request 150 to a block list, the supplemental mitigation module(s) 110 may help prevent or mitigate future instances of this same network threat.

In the depicted embodiment, the supplemental mitigation module 110 passes tracking information 122, corresponding to the request 150, to the feedback module 112. Tracking information 122 is discussed in more detail below with reference to FIG. 2. For the purposes of the present discussion, note that the tracking information 122, for a given request 150, may include an identifier that uniquely identifies the request 150 as well as information indicating the defense layer 106 or defensive operation(s) 108 to which the request 150 was routed, the outcome information 109, an indication of any additional mitigation operations applied by the supplemental mitigation module 110, etc. In FIG. 1, the tracking information 122 is then passed to the analytics module 114, which, in various embodiments, is operable to determine updated weightage values 124 based on the tracking information 122. The operation of analytics module 114, according to some embodiments, is described in detail below with reference to FIG. 3. Note, however, that in various embodiments the analytics module 114 may determine the updated weightage values 124 based on an optimization goal selected for the particular type of network attack. In various embodiments, the updated weightage values 124 may then be provided (e.g., via the feedback module 112) to the distribution module 104, which may use the updated weightage values 124 to modify the manner in which it routes requests 150 potentially associated with the particular type of network attack. Note that, in various embodiments, the process described above may be repeated as desired (e.g., periodically, after a predetermined number of requests have been analyzed, etc.), allowing the disclosed techniques to change the manner in which it distributes traffic to adapt to changes in network attacks. Further note that, in various embodiments, the disclosed techniques may be used to determine updated weightage values 124 corresponding to multiple different types of network attacks, allowing the disclosed system to customize its defensive approach to each of these different types of threats in a manner that matches a desired optimization goal.

As one non-limiting example, assume that the optimization objective selected (e.g., by a security engineer associated with server system 102) for a particular type of network attack (e.g., SQL injection attacks) is to improve the effectiveness of the applied defensive measures so that, in determining the updated weightage values 124, the analytics module may modify the manner in which the requests 150 are distributed such that more traffic is routed through the more effective defense layers 106 and defensive operations 108. Further, in this example, assume that, by analyzing the tracking information 122, analytics module 114 determines that defensive operation 108C has been the most effective (e.g., strictest) in blocking requests 150 that are deemed to be SQL injection attacks. In this example, the analytics module 114 may generate the updated weightage values 124 so as to increase the percentage of the requests 150 that have been identified as potential SQL injection attacks routed to the defensive operation 108C. For instance, updated weightage values 124 may specify that for subsequent requests 150 that are identified as potential SQL injection attacks, 80% of those requests 150 are to be routed to defense layer 106A and 20% to defense layer 106B, and that, of those requests routed to defense layer 106A, 75% (60% of the total requests 150 identified as potentially being SQL injection attacks) are sent to defense operation 108C, 10% to defense operation 108A, and 10% to defense operation 108C (with the remaining 20% of the total requests 150 identified as potential SQL injection attacks being routed to defense operation 108D). Using updated weightage values 124, the distribution module 104 may then determine how to route subsequent requests 150 corresponding to potential SQL attacks.

Figure 2:
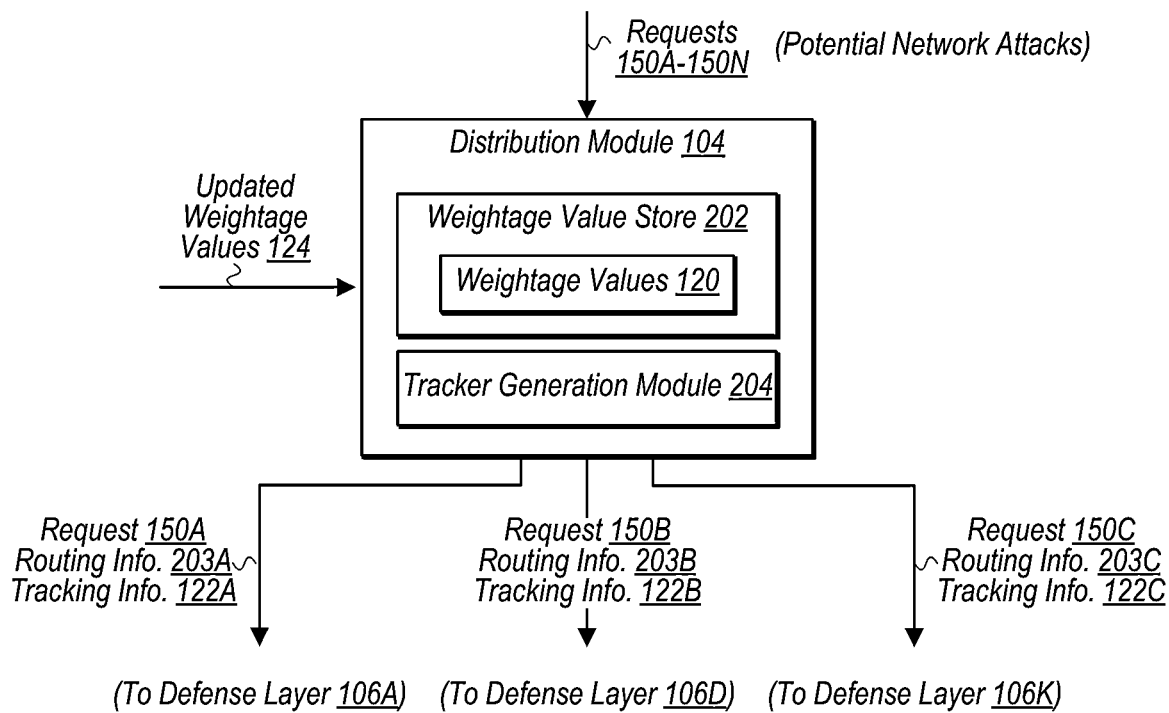
FIG. 2 is a block diagram illustrating an example distribution module, according to some embodiments.

Turning now to FIG. 2, block diagram 200 depicts an example distribution module 104, according to some embodiments. As noted above, in various embodiments, the distribution module 104 is operable to route requests 150 that have been identified as a potential network attack between various defense layers 106. In the depicted embodiment, for example, the distribution module 104 includes (or has access to) weightage value store 202, which stores the weightage values 120 that the distribution module 104 may use to determine the defense layer 106 (or defensive operation 108) to which to route the various requests 150. As noted above, the manner in which the distribution module 104 distributes traffic may change over time as the analytics module 114 determines the updated weightage values 124 so as to improve the performance of the various defense layers 106 and defensive operations 108 relative to a selected optimization goal.

In various embodiments, the weightage values 120 may be initialized using various suitable techniques. For example, in some embodiments, the weightage values 120 for a particular type of network attack may be initialized so as to evenly distribute the requests 150 across the available defense layers 106 or defensive operations 108. Referring again to the embodiment depicted in FIG. 1, as a non-limiting example, the weightage values 120 may initially be chosen such that requests 150 potentially associated with a particular type of network attack are distributed evenly between defensive operations 108A-108D. Note, however, that this embodiment is provided merely as one non-limiting example. In other embodiments, for example, the weightage values 120 may be initialized so as to distribute the requests 150 across the defense layers 106 or defensive operations 108 using any suitable percentages. With reference again to the embodiment of FIG. 1, consider an instance in which defensive operations 108A, defensive operations 108B, and defensive operations 108D are established defense operations that have been tested and are known to be effective in detecting and preventing a particular type of network attack, while defensive operations 108C is a new defensive operation whose effectiveness is not yet known. In such an embodiment, the weightage values 120 may be established so as to initially route only a small amount (e.g., 5%) of the network traffic for the particular type of network attack to the defensive operation 108C. After some period of use, the analytics module 114 may determine updated weightage values 124, increasing or decreasing the amount of traffic routed to defensive operation 108C depending on its performance. Accordingly, in various embodiments, the disclosed techniques may be used to introduce new defensive operations 108 into production for testing and refinement without subjecting the server system 102 to undue levels of risk, allowing the server system 102 to track and evaluate the effectiveness of its defense layers 106 and defensive operations 108.

In the depicted embodiment, the distribution module 104 is shown routing three requests 150 between three different defense layers 106 (not shown separately, for clarity). More specifically, in FIG. 2, the distribution module 104 is shown routing request 150A to defense layer 106A, request 150B to defense layer 106D, and request 150C to defense layer 106K. Note that, in the depicted embodiment, in addition to sending the requests 150 to the selected defense layers 106, the distribution module 104 may include one or more items of additional information, such as routing information 203. For example, as noted above, the distribution module 104 may also control the defensive operation 108 to which a given request 150 is routed. In some embodiments, the distribution module 104 may include routing information 203 so as to instruct the defense layer 106 as to the defensive operation 108 to use for the given request 150. As a non-limiting example, for request 150A that the distribution module 104 routes to defense layer 106A, the routing information 203A may instruct the defense layer 106A to utilize defensive operation 108A. Note that, in some embodiments, rather than instructing the defense layer 106 as to the particular defensive operation 108 to apply for each of the requests 150, the distribution module 104 may instead provide routing information 203 (either periodically or with some (or all) of the requests 150) instructing that defense layer 106 as to the manner in which to split the traffic between the defensive operations 108 to which that defense layer 106 has access (e.g., using one or more percentage values or using any other suitable format).

Further note that, in the depicted embodiment, the distribution module 104 includes tracking information 122 along with the request 150 as the request 150 is routed to its selected path. For example, in FIG. 2, the distribution module 104 includes tracker generation module 204, which, in various embodiments, is operable to generate one or more items of tracking information 122 for the various requests 150. In some such embodiments, this tracking information 122 will be routed with the request 150 as it flows through the defense layers 106 and defensive operations 108. For example, in various embodiments, the tracker generation module 204 will generate, for each request 150, a corresponding identifier value. Note that the identifier value for a given request 150 may be generated using any of various suitable techniques. In some embodiments, the manner in which the identifier value is generated may depend on the technique used by the distribution module 104 to split similar types of potential network attacks between the various defense layers 106. For example, in instances in which similar streams of network traffic are split or grouped by signature (e.g., brute-forcing attacks, SQL injection attacks, etc.), then, in some embodiments, the entire stream of the network traffic may be given a single identifier. As a non-limiting example, in some embodiments, such an identifier may be formatted as follows: signatureType_<endpoint>_date. Further, in embodiments in which the distribution module 104 splits similar types of potential network attacks based on the IP address of its originating device (e.g., instances in which there are IP addresses that are relatively static throughout an attack and happen to share IP addresses with legitimate users such that the malicious IP address cannot simply be blocked), the identifier value for a given request 150 may include one or more temporal components. As a non-limiting example, in some embodiments, such an identifier may be formatted as IP_address+endpoint (e.g., "1.2.3.4.login," "2.3.4.5.login," etc.), though other formats may also be used. In instances in which the distribution module 104 splits similar types of potential network attacks based on patterns (e.g., URLs containing 100 re-used session keys), then the identifier value for a given request 150 could be formatted as <sessionKey>_endpoint (e.g., "123456_login," "098765_login," etc.), though other formats may also be used. In instances in which the distribution module splits similar types of potential network attacks based on types of traffic (e.g., web traffic, API traffic, etc.), the identifier values for a given request 150 may include one or more header values.

In various embodiments, as a request 150 is routed through the disclosed system, one or more items of additional information may be appended or otherwise added to the tracking information. For example, in some embodiments, as a request 150 passes through the disclosed system, the tracking information 122 may be updated so as to identify one or more of the defense layer 106 to which the request 150 was routed, the defensive operation(s) 108 that were applied for the request 150, the outcome information 109 for the defensive operation(s) 108, etc. State differently, in various embodiments, the tracking information may be incrementally constructed as a corresponding request 150 is processed such that the tracking information 122 is usable (e.g., by the analytics module 114) to identify a request 150, the defense layer 106 and defensive operation 108 that request 150 was routed through, and the corresponding outcome information 109. In various embodiments, the tracking information 122 may be used by the analytics module 114, as described in more detail below with reference to FIG. 3, to evaluate the performance of the system for the request 150 so as to determine the updated weightage values 124. In various embodiments, as the distribution module 104 receives the updated weightage values 124 from the analytics module 114, the distribution module 104 may update the manner in which it distributes traffic, enabling the system to adapt to changes in network attacks and improve network security of the server system 102.

Figure 3:
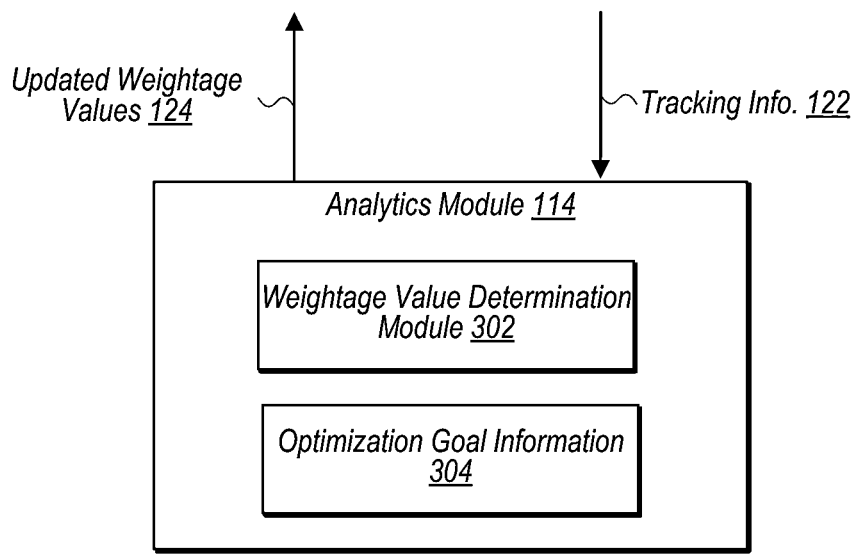
FIG. 3 is a block diagram illustrating an example analytics module, according to some embodiments.

Referring now to FIG. 3, block diagram 300 depicts an example analytics module 114, according to some embodiments. In FIG. 3, the analytics module 114 includes weightage value determination module 302, which, in various embodiments, is operable to determine updated weightage values 124 based on tracking information 122. For example, in the depicted embodiment, the analytics module 114 is shown receiving tracking information 122 (e.g., from feedback module 112), which, as noted above, tracking information 122 may include various items of information to identify a request 150, the defense layer 106 to which it was routed, the defensive operation 108 that was applied to it, the outcome 109 of that defensive operation 108, whether any additional mitigation operations were performed (e.g., by supplemental mitigation module 110), etc.

Further, in the depicted embodiment, the analytics module 114 includes (or has access to) optimization goal information 304, which specifies optimization goals for one or more types of network attacks. For example, in various embodiments, a user associated with the server system 102 (e.g., a security engineer) may select or specify an optimization goal for each (or some subset) of the different types of network attacks for which the disclosed techniques are operable to route traffic. Non-limiting examples of optimization goals include effectiveness of defenses, efficiency, time-to-remediation, comprehensiveness, reduction of abuse duration or volume, time-to-mitigation, model resources used, etc. The "effectiveness of defenses" optimization goal, for example, may aim to minimize the amount of successful attempts by an attacker. For example, if the attacker sent 100 abusive attempts, the "effectiveness of defenses" optimization goal may consider the percentage of those attempts that went through the various defenses of server system 102 without being blocked. The "efficiency" optimization goal, in some embodiments, may consider the amount of input of resources (e.g., hardware or software resources) or time. Stated differently, the "efficiency" optimization goal may consider how to maximize or distribute traffic so as to achieve maximum efficiency while accounting for the various hardware or software limitations of the defense layers 106 or defensive operations 108 being utilized. As a non-limiting example, if a block list of a certain defensive path can only hold 1,000 IP addresses, the "efficiency" optimization goal may consider how to utilize this limited resource such that the list keeps the 1,000 most abusive IP addresses. The "time-to-remediation/mitigation" optimization goals, in some embodiments, considers the time period from when the system decides to impose a block to the actual time that the block is accomplished or performed. For example, different defense layers 106 or defensive operations 108 may have differing latencies and throughput (e.g., depending on the load, the time of the day, etc.). Accordingly, in some embodiments, the "time-to-remediation/mitigation" optimization goals may take these latency and throughput considerations into account when determining how to adjust the weightage values so as to block potentially abusive traffic as quickly as possible. The "reduction in abuse duration" optimization goal, in some embodiments, considers the total duration of the abuse or attack and the available techniques that may be used to prevent these attacks. For example, by making the defenses stricter and reducing threshold limits to a minimum, the server system 102 may effectively make attackers' efforts futile and encourage the attackers' to stop their operations. Note that, in some such embodiments, the extent to which the defenses are made stricter may be balanced against increased friction or impact on legitimate traffic. The "accuracy" optimization goal, in some embodiments, may focus on maximizing the percentage of abusive traffic that is blocked, while minimizing the percent of legitimate traffic that is blocked. That is, the accuracy optimization goal may attempt to balance the two such that the overall accuracy score is the highest. For example, in an instance in which there is only a small percentage of abusive traffic in high-flowing legitimate traffic, the accuracy optimization goal may attempt to block out the abuse less than other optimization goals would.

Note that, in various embodiments, the optimization goal selected may depend on the negative impacts associated with a particular type of network attack. For example, if each instance of abuse carries a corresponding financial penalty, the "reduce in abuse volume" or "effectiveness of defenses" optimization goals may be selected. If, for example, there are hardware or software limitations on the defenses, such as the case in a DDoS attack, the "efficiency" optimization goal may be selected. Further, if the particular type of network attack results in a leak of sensitive data, the "time-to-mitigation" optimization goal may be selected for that particular type of network attack, etc. Additionally, note that, in various embodiments, each different type of network attack may have its own distinct optimization goal while, in other embodiments, the same optimization goal may be shared between two or more different types of network attack. Further note that, in some embodiments, a given type of network attack may have more than one optimization goal (e.g., a primary optimization goal and a secondary optimization goal, a scale in which different amounts of emphasis are placed on multiple different optimization goals for a particular type of network attack, etc.).

In various embodiments, the weightage value determination module 302 may determine updated weightage values 124 based on various factors, such as the particular type of network attack involved, the optimization goal for the particular type of network attack, effectiveness of the various defense layers 106 and defensive operations 108, etc. For example, in various embodiments, the weightage value determination module 302 may analyze the tracking information 122 corresponding to multiple (and, potentially, many) requests 150 and, depending on the optimization goal and how well that goal is met using the existing weightage values 120, the weightage value determination module 302 will modify the weightages in an attempt to increase the success rate of the selected goal. As a non-limiting example, if the optimization goal is to reduce abuse volume, the weightage value determination module 302 may measure, for a tracked stream of traffic, how long the abuse persists or how much abusive traffic is sent before the specific abuse level subsides, which may be measured by the amount of login failures per time period for a given identified list of users. Based on this information, the weightage value determination module 302 may generate the updated weightage values 124 so as to increase the percentage of traffic that is routed to the defense layers 106 and the defensive operations 108 that are deemed more successful in reducing the abuse volume. As a non-limiting example, consider an instance in which the optimization goal for a particular type of network attack is to minimize abuse volume and, using the existing weightage values 120, 10% of the abusive traffic is passing through defensive operation 108A unblocked, 20% of the abusive traffic is passing through defensive operation 108B unblocked, and 30% of the abusive traffic is passing through defensive operation 108C unblocked. In this non-limiting example, the analytics module 114 may calculate the updated weightage values 124 so as to route a higher percentage of the traffic to those defenses that are performing better (e.g., defensive operation 108A) at that point in time and may dynamically adjust the weightage values if conditions change. For example, defensive operations 108B and 108C may consume fewer resources or may perform the blocks at a faster rate, though may be less accurate.

Note that, in various embodiments, one or more (or each) of the defense layers 106 or defensive operations 108 may have one or more threshold values, such as a maximum threshold value indicating a maximum amount of network traffic that may be routed to the defense layer 106 or defensive operation 108 or a minimum threshold value indicating a minimum amount of network traffic that is to be routed to the defense layer 106 or defensive operation 108, or both. In various embodiments, such threshold values may be beneficial in balancing the load of traffic between the various defense layers 106 and defensive operations 108 so as to prevent the system from becoming predictable to malicious users that would aim to discover details about the server system 102's network security. In some embodiments, the weightage value determination module 302 limits the manner in which it modifies the distribution weightage values so as to stay within the maximum or minimum threshold values for the various defense layers 106 or defensive operations 108. Note, however, that, in some embodiments, the weightage value determination module 302 may also modify the threshold values for the various defense layers 106 or defensive operations 108. For example, if the analytics module 114 determines that a particular defensive operation 108 is performing poorly for a particular type of network traffic (e.g., SQL injection attacks), it may modify the threshold value(s) for that defensive operation 108 such that requests 150 potentially belonging to that type of network attack are no longer routed to that particular defensive operation 108.

Accordingly, in various embodiments, the weightage value determination module 302 may determine the updated weightage values 124 so as to modify the distribution of requests 150, to the various defense layers 106 and defensive operations 108, in such a way that improves the system's performance relative to a selected optimization goal. Since the tracking information 122 indicates the success rate of the different defensive operations 108, the weightage value determination module 302 may generate the updated weightage values 124 so as to steer an increased amount of requests 150 to the defensive operations 108 that are more successful relative to the selected optimization goal(s). Further, note that, in various embodiments, the disclosed system may continue to collect and monitor tracking information, allowing the analytics module 114 to iteratively refine the weightage values for various different types of network attacks over time.

Figure 4:
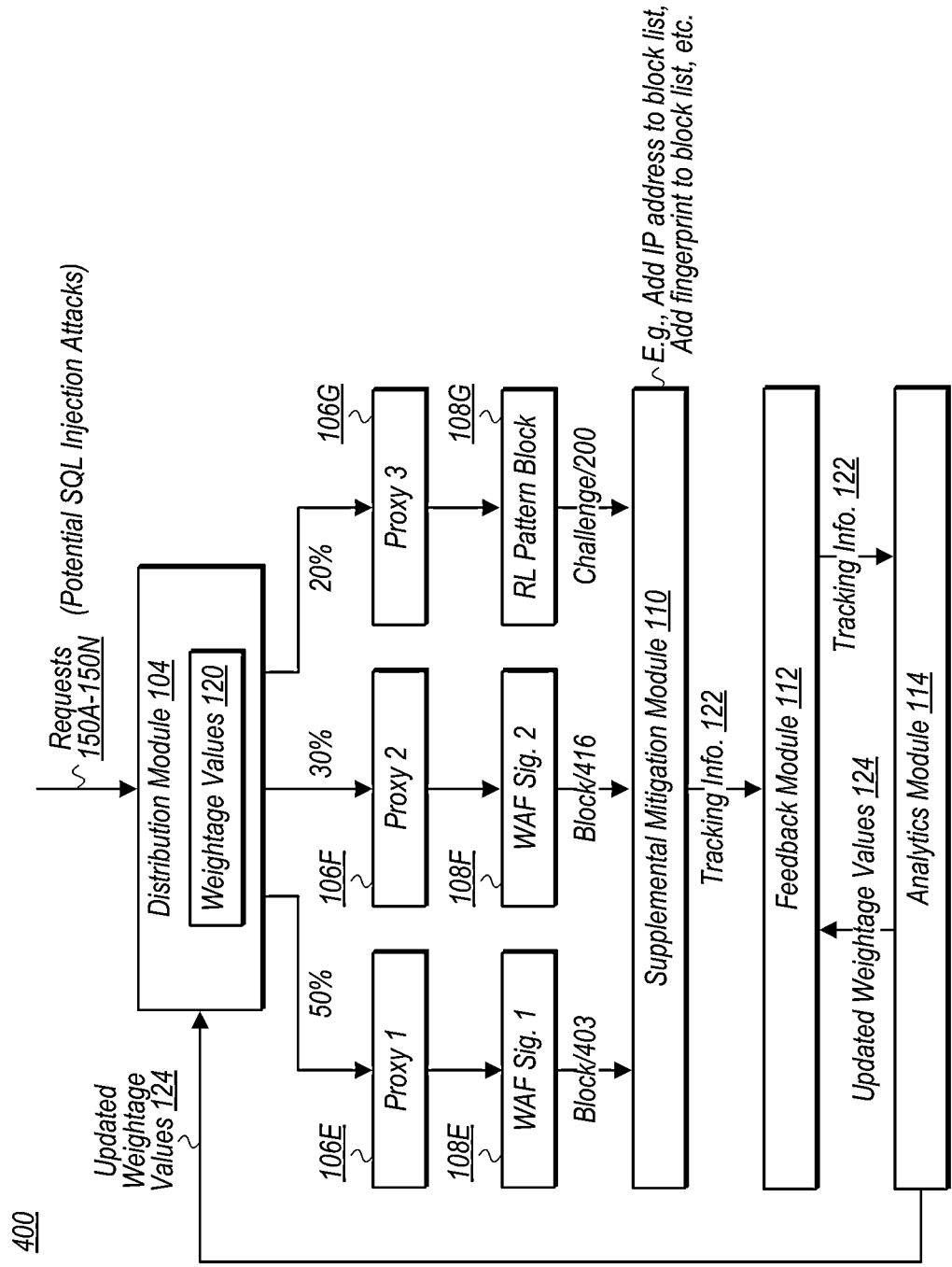
FIG. 4 is a block diagram illustrating an example system that dynamically routes network traffic between defense layers, according to some embodiments.

Turning now to FIG. 4, block diagram 400 depicts an example system implementing the disclosed dynamic routing techniques, according to one non-limiting embodiment. In the depicted embodiment, distribution module 104 receives various requests 150 that have been identified as potential SQL injection attacks.

In FIG. 4, defense layers 106E-106G are implemented using proxy servers, as one non-limiting example of potential defense layers 106 that may be used according to some embodiments. Note that, in various embodiments, one or more of the proxy servers may be internal to server system 102, external to the server system 102, or implemented using a third-party service. Further, in FIG. 4, specific non-limiting examples of defensive operations 108E-108G are shown. More specifically, in the depicted embodiment, Proxy Server 1 applies a first WAF signature, Proxy Server 2 applies a second WAF signature, and Proxy Server 3 applies a rate-limiting pattern block. Note that, in some embodiments, each WAF provider may utilize different WAF signatures, which may or may not overlap. For example, some WAF signatures may be specific and targeted to a specific instance of a particular type of network attack (e.g., a WAF signature designed to cover specific types of SQL injection attacks) while other WAF signatures may be more generic (e.g., a WAF signature designed to cover all SQL injection attacks).

Once the proxy servers have performed their respective defensive operations, the outcome information 109 is provided to the supplemental mitigation module 110. In FIG. 4, for example, Proxy Server 1 provides an HTTP status code of 403, Proxy Server 2 provides a custom WAF status code 416, and Proxy Server 3 provides an HTTP status code of 200. As described above, once it receives this outcome information 109, supplemental mitigation module 110 may perform one or more additional mitigation operations, such as adding a client's IP address or device fingerprint to a block list. The disclosed system may then, as described above, analyze the performance of the various defense layers 106 and defensive operations 108 and modify the weightage values as desired to improve the performance of the network security relative to the selected goal for the relevant type of attack (e.g., SQL injection attacks, in the current non-limiting example).

Note that, in various embodiments, the disclosed techniques further include providing a workflow framework for network security, such as investigations and findings, which may assist users (e.g., defense engineers) in understanding how many threats are caught by the server system 102's existing defenses and to identify those areas in which further defensive work is needed. In various embodiments, monitoring and maintaining such data may provide valuable insight by allowing the defense engineers associated with the server system 102 to learn from past defensive work. For example, using such data, in the next recurrence of an incident, insights gleaned from past incidents may be leveraged such that gaps in the defensive posture of the server system 102 may be anticipated and the probability of certain accompanying threats ascertained.

The following is a non-limiting example in the context of incident response where incident notes (made, for example, by an analyst investigating a network attack incident) may be used to obtain data and build a data model relating to network attacks performed or attempted against the server system 102. For example, in various embodiments, the disclosed techniques may include collecting data as to common threat indicators, the number of pertinent detection alerts for each of those threat indicators, the confidence levels for those threats based on the defensive strength of the server system 102 to the respective threat indicators (e.g., the amount of relevant defenses against the specific threats), and corresponding counters of various types of incidents (e.g., coin mining, banking Trojan, credential stuffing, etc.) that match one or more of those threat indicators. Non-limiting examples of such threat indicators include: vulnerability scanning, keys or credentials exposed, accounts created, process tampered, malware downloaded, brute-forcing, availability affected, command and control ("C2") traffic established, lateral movement, backup tainted, malicious email, C2 beaconing observed, virus spread, user access removed, remote code execution ("RCE"), encryption involved, data exfiltration, and admin compromised. In various embodiments, this data may be used (e.g., by a defense engineer) to identify the high threat indicators that have low defense-confidence and alert numbers so as to prioritize more work to be done on these threat indicators to which the server system 102 is potentially vulnerable.

In some such embodiments, for each new security incident that is investigated, the investigation steps taken and findings made by the security analyst may be logged. For example, in various embodiments, the disclose techniques may provide a standardized format to capture the investigation steps and findings such that a base of valid threats are logged against different types and instances of incidents.

Further, in some embodiments, this data may be used to train one or more machine learning models that may be used to further assist in detecting and mitigating potential network attacks.

In various embodiments, these disclosed techniques may provide various technical benefits. For example, in various embodiments, the model may learn and be more accurate in predicting which threats would likely be present in any new incidents and prompt an analyst as to those threats that are potentially being missed. Further, in various embodiments, these techniques may further assist in automating the investigation and handling of security incidents and providing an up-to-date view of the detection coverage against incoming threats, including those areas in which further defensive work should be prioritized (e.g., to work on lateral movement and process tampering as top priority, then exposed keys/credentials, and so on). Additionally, in some embodiments, these disclosed techniques may reduce repeated mistakes such as undermining the incident severity, or failing to verify or investigate certain areas.

In various embodiments, these disclosed techniques for building a data model relating to network attacks may also be integrated with the disclosed techniques for dynamically routing network traffic between defense layers. For example, in some embodiments, the various threat indicators above could be used to identify potential network attacks, which could then be routed to the distribution module 104 or further divided into sub-tracks. For example, the threat indicator of "brute-forcing" could be subdivided into sub-tracks for "password spraying," "credentials stuffing," and "dictionary attacks." As a further example, the threat indicator of "vulnerability scanning" could be subdivided into sub-tracks for "port scanning" and "host scans." Each of these tracks or sub-tracks may feed traffic into the distribution module 104 to determine the optimal manner in which to route these various sub-tracks of potential network attacks, which, in turn, may help increase the "defense confidence" levels in the model above. Additionally note that, in various embodiments, the above model may also help identify those areas that are lacking in detection alerts or rules, which may be used to identify the types of threats before feeding into the distribution module 104.

Example Methods

Figure 5:
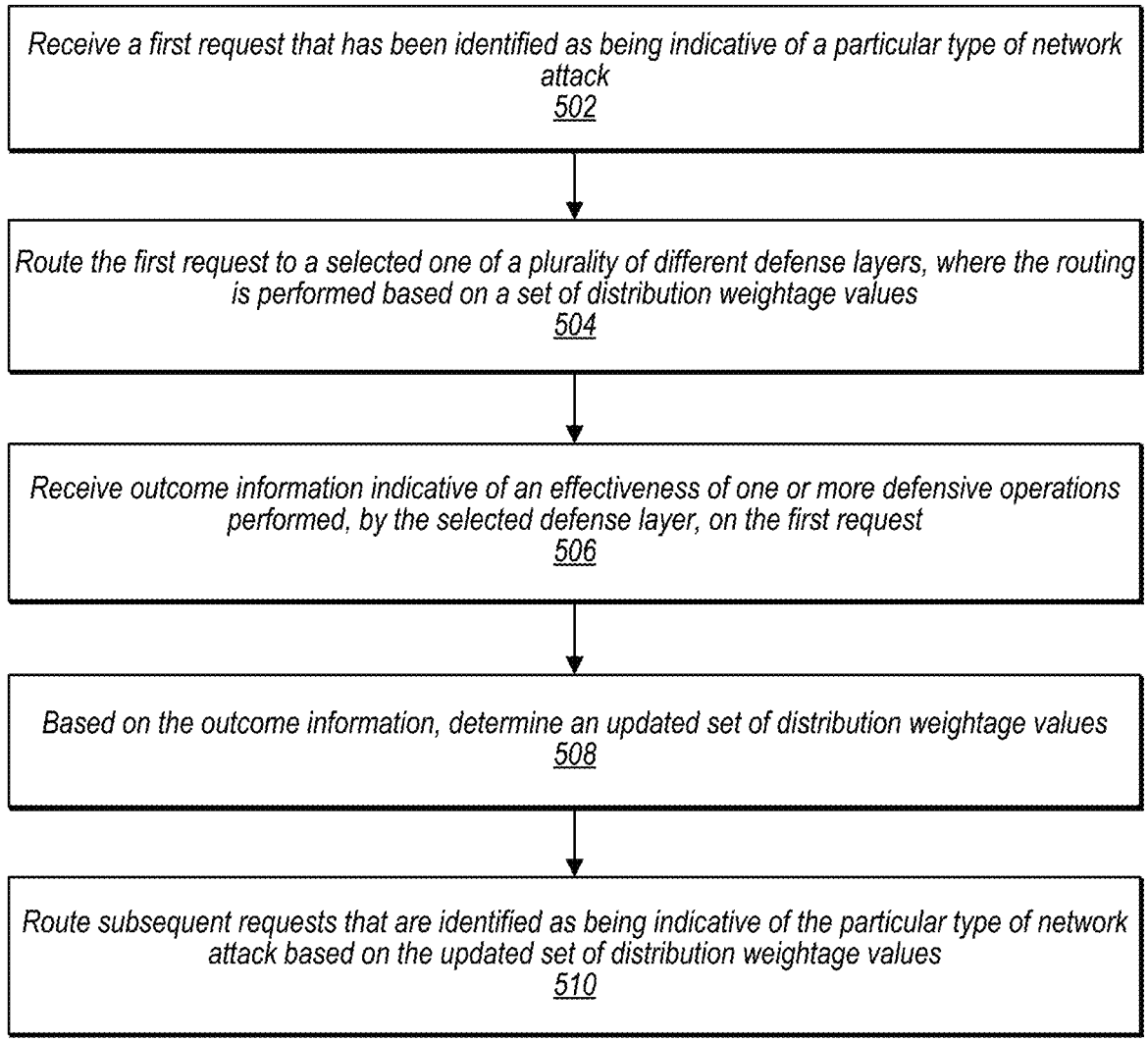

Referring now to FIG. 5, a flow diagram illustrating an example method 500 for dynamically routing network traffic between various defense layers is depicted, according to some embodiments. In various embodiments, method 500 may be performed by one or more of distribution module 104, feedback module 112, and analytics module 114 of FIG. 1 to dynamically route one or more requests 150 between defense layers 106. For example, server system 102 may include (or have access to) a non-transitory, computer-readable medium having program instructions stored thereon that are executable by one or more computing devices within the server system 102 to cause the operations described with reference to FIG. 5. In FIG. 5, method 500 includes elements 502-510. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the traffic distribution module 104 receives a first request 150 that has been identified as being indicative of a particular type of network attack. As a non-limiting example, the first request 150 may be one that has been identified as a potential password spraying attack.

At 504, in the illustrated embodiment, the traffic distribution module 104 routes the first request 150 to a selected one of a plurality of different defense layers 106. In various embodiments, the selected defense layer 106 may include one or more on-premises network devices that are implemented within the server system 102 or may include one or more third-party systems that are implemented outside of the server system 102. As noted above, in various embodiments, the distribution module 104 may determine the manner in which to route the first request 150 based on one or more weightage values 120. For example, in some embodiments, the weightage values 120 may include values (e.g., provided as percentages or in any other suitable representation) that indicates the relative amount of traffic that should be distributed amongst the various defense layers 106A-106N. Further, in some embodiments, for a given defense layer 106, the weightage values 120 may specify the relative amount of the traffic to direct to individual ones of the defensive operations 108 available to that defense layer 106. Additionally, in various embodiments, for network traffic that is identified as being indicative of a particular type of network attack, the set of distribution weightage values 120 may include an upper threshold value indicating a maximum percentage of the network traffic to route to a particular network layer, and a lower threshold value indicating a minimum percentage of the particular type of the network traffic to route to the particular defense layer. Note that, in some embodiments, the plurality of defense layers 106 may include a first defense layer (e.g., defense layer 106A) that is operable to perform a first set of one or more defense operations 108, such as applying a WAF signature to determine whether the first request is of the particular type of network attack.

At 506, in the illustrated embodiment, the feedback module 112 receives outcome information 109 indicative of an effectiveness of one or more defensive operations 108 performed, by the selected defense layer 106, on the first request 150. For example, as discussed above, the defensive operation(s) 108 applied for a given request 150 may produce outcome information 109 (e.g., an HTTP response status code) that is passed (e.g., as part of the tracking information 122) to the feedback module 112. At 508, in the illustrated embodiment, based on the outcome information 109, the analytics module 114 determines an updated set of distribution weightage values 124. In some embodiments, determining the updated set of distribution weightage values 124 includes determining, based on the outcome information 109, that the first request was blocked by at least one of the one or more defensive operations 108 performed by the selected defense layer 106, and generating the updated set of distribution weightage values 124 such that a higher percentage of network traffic is routed, by the distribution module 104, to the selected defense layer 106. Further, in some embodiments, the updated set of distribution weightage values 124 may indicate a first percentage of the subsequent requests 150 to route to individual ones of the plurality of different defense layers 106 and, for a given defense layer 106 that provides a plurality of defensive operations 108, a second percentage of the subsequent requests 150 that are routed to the given defense layer 106 to route to individual ones of the plurality of defensive operations 108.

At 510, in the illustrated embodiment, the traffic distribution module 104 routes subsequent requests 150 that are identified as being indicative of the particular type of network attack (e.g., password spraying attacks) based on the updated set of distribution weightage values 124. Note that, in some embodiments, tracking information 122 may be created for, and routed with, the requests 150. For example, in some embodiments, the traffic distribution module 104 may add a metadata value to the first request 150, where the metadata value is used to track the first request 150 as it is processed by the selected defense layer 106. In some such embodiments, the selected defense layer may select a particular defensive operation 108 for the first request 150 based on at least one of the set of distribution weightage values 120 and may update the metadata value to further identify the selected defense layer 106 and the particular defensive operation 108 by which the first request is processed.

Note that, in some embodiments, the outcome information 109 may indicate that the first request 150 was blocked by the one or more defensive operations 108 applied by the selected defense layer 106. In such embodiments, method 500 may further include performing one or more additional mitigation operations (e.g., by supplemental mitigation module 110), such as adding an IP address of the client device that sent the first request 150 to a block list or adding, to a block list, a device fingerprint corresponding to the client device that sent the first request 150.

Turning now to FIG. 6, a flow diagram illustrating an additional example method 600 for dynamically routing network traffic between various defense layers is depicted, according to some embodiments. In various embodiments, method 600 may be performed by one or more of distribution module 104, feedback module 112, and analytics module 114 of FIG. 1 to dynamically route one or more requests 150 between defense layers 106. For example, server system 102 may include (or have access to) a non-transitory, computer-readable medium having program instructions stored thereon that are executable by one or more computing devices within the server system 102 to cause the operations described with reference to FIG. 6. In FIG. 6, method 600 includes elements 602-610. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the server system 102 implements a traffic distribution module 104 that is operable to distribute a particular type of network traffic across a plurality of different defense layers 106. In the depicted embodiment, the plurality of different defense layers include a first defense layer that is operable to perform a first set of one or more defensive operations, and a second defense layer that is operable to perform a second set of one or more defensive operations. In some embodiments, at least one of the first and second sets of one or more defensive operations include applying a WAF signature.

At 604, in the illustrated embodiment, the traffic distribution module 104 receives a first plurality of requests 150A-150J that have been identified as indicative of the particular type of network traffic. At 606, in the illustrated embodiment, the traffic distribution module 104 routes the first plurality of requests 150A-150J across the plurality of different defense layers 106, where the routing is performed based on a set of distribution weightage values 120. As a non-limiting example, in some embodiments the set of distribution weightage values 120 indicates a first percentage of the first plurality of requests 150A-150J to route to the first defense layer 106A and a second percentage of the first plurality of requests 150A-150J to route to the second defense layer 106B. In some such embodiments, method 600 may further include identifying the first plurality of requests 150A-150J as being indicative of the particular type of network traffic based on a signature associated with the particular type of network traffic. For example, in some embodiments, the server system 102 may, prior to directing the requests 150A-150J to the distribution module 104, use one or more signatures associated with the particular type of network traffic to identify the requests 150A-150J as potentially being associated with that particular type of network traffic and, in response to this identification, direct those requests 150A-150J to the distribution module 104.

At 608, in the illustrated embodiment, the analytics module 114 determines an updated set of distribution weightage values 124 based on an effectiveness of the plurality of different defense layers 106 in mitigating the particular type of network traffic. In some embodiments, the updated set of distribution weightage values 124 may be determined based on a particular optimization goal (e.g., reducing a time-to-mitigation) associated with the particular type of network traffic. Further, in some embodiments, determining the updated set of distribution weightage values at element 608 may include analyzing the effectiveness of the first and second defense layers 106A-106B and, in response to determining that the second defense layer 106B was more effective than the first defense layer 106A in mitigating the particular type of network traffic for the first plurality of requests 150A-150J, generating the updated set of distribution weightage values 124 such that, relative to the set of distribution weightage values 120, a higher percentage of network traffic is routed to the second defense layer 106B. At 610, in the illustrated embodiment, the traffic distribution module routes a second plurality of requests 150K-150M across the plurality of different defense layers 106 based on the updated set of distribution weightage values 124.

In some embodiments, the disclosed techniques may include using one or more threat vectors identified with regard to a particular request 150 to expand the manner in which the server system 102 identifies potential network attacks. For example, as requests are received by the server system 102, that traffic may be analyzed to identify requests 150 that are deemed to potentially be network attacks. In various embodiments, the server system 102 may identify these potentially malicious requests 150 based on one or more indicators (also referred to herein as "threat vectors" or simply "vectors") associated with the requests 150. Non-limiting examples of threat vectors include IP address, device fingerprint, attack signature matching, pattern matching, etc. To identify web requests 150 that are potential network attacks, the requests may first pass through one of server system 102's various content delivery network ("CDN") nodes, which may be located at various geographic locations around the world. Once the requests 150 is parsed by the CDN node, it may be passed to WAF filtering where various different signatures are used to identify the type(s) of network traffic to which the request relates. If a request 150 is identified (e.g., using one of these threat vectors) as potentially being a particular type of network attack, that request 150 (along with an identifier of the particular type of network attack with which it is potentially associated) may be routed to the distribution module 104 and other, legitimate traffic (that has not been identified by the various threat rules and vectors as potentially malicious) may then be routed to the appropriate services within the server system 102.

For potential SQL injection attacks, for instance, the server system 102 may compare the requests 150 to an attack signature for SQL injection attacks, which could include a regular expression ("RegEx") pattern that includes one or more SQL keywords. If, in this scenario, the server system 102 determines that a given request 150 is potentially a SQL injection attack based on a match with the corresponding attack signature, that request 150 may be routed to the distribution module 104. In various embodiments, such a process may be utilized to route requests 150 corresponding to (potentially many) different types of network attacks to the distribution module 104, where the distribution module 104 may dynamically distribution the requests 150 across the various defense layers 106 and defensive operations 108 as described herein.

Note, however, that server system 102's ability to identify potentially malicious requests 150 and route them to the distribution module 104 depend, in at least some embodiments, on the efficacy of the threat vectors that the server system 102 uses. Accordingly, if the server system 102 is unaware of a particular threat vector for a given type of network attack, the server system 102 will be more susceptible to attacks of that type. Such is true even for embodiments in which machine learning-based anomaly detection algorithms are used to detect potential network threats, as attacks that are not identified as anomalous using such systems are not caught.

In various embodiments, however, the disclosed techniques may be used to identify new threat vectors, which, in turn, may be used by the system to identify malicious traffic that may have otherwise gone undetected. For example, in some embodiments, from an initial set of threat vectors that are caught by server system 102's rules, in addition to (or instead of) one or more mitigation operations that may be taken by supplemental mitigation module 110, the disclosed techniques may include expanding the initial set of threat vectors to query for more traffic patterns based on commonalities (e.g., IP address, device fingerprint, user-agent string/ detected, hostname, etc.). Stated differently, in some embodiments the disclose techniques include identifying one or more vectors (e.g., IP address) associated with a particular type of attack and then using those one or more threat vectors as a profile to perform a broader search. In doing so, such embodiments may be used to detect other malicious activity performed by the malicious user(s) that the existing threat-detection rules may not be catching. For example, instead of blocking a user-agent that is linked to an exploit kit, the disclosed techniques may include use that user-agent as a threat vector to query a larger set of traffic logs and to obtain a larger pool of logs that are representative of the originating threat source. Consider, for instance, a situation in which a particular malicious user is hitting the server system 102 with multiple (e.g., seven) different attack vectors and the existing defenses are only blocking three of these attack patterns. Using the disclosed techniques, the server system 102 may take the three identified vectors and perform an expansion to find the remaining four vectors (or a subset thereof, which may be used to fine the remaining vectors), allowing the server system 102 to now be capable of detecting all seven attack vectors.

Figure 7:
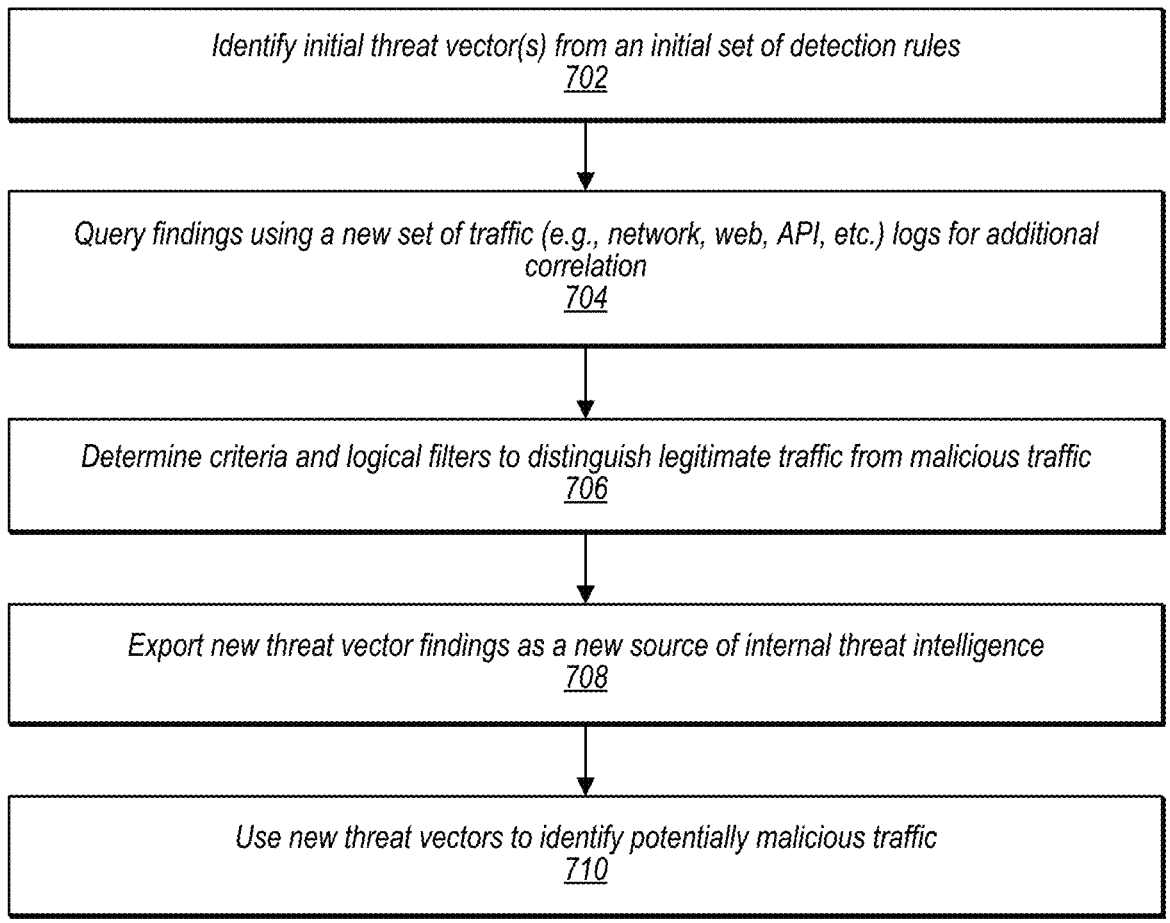
FIG. 7 is a flow diagram illustrating an example method for identifying new threat vectors, according to some embodiments.

Referring now to FIG. 7, a flow diagram illustrating an additional example method 700 for identifying new threat vectors and using these new threat vectors to detect potentially malicious network traffic is depicted, according to some embodiments. In various embodiments, method 700 may be performed by supplemental mitigation module 110 of FIG. 1 to identify one or more threat vectors associated with a particular type of network attack. For example, server system 102 may include (or have access to) a non-transitory, computer-readable medium having program instructions stored thereon that are executable by one or more computing devices within the server system 102 to cause the operations described with reference to FIG. 7. In FIG. 7, method 700 includes elements 702-710. While these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, the supplemental mitigation module 110 identifies one or more initial threat vector(s) from an initial set of threat-detection rules. For example, the disclosed techniques may take one or more threat sources (e.g., IP addresses) from the initial set of detection rules that are used by server system 102 to route requests 150 to the distribution module 104. At 704, in the illustrated embodiment, the supplemental mitigation module 110 queries those findings using a new set of traffic logs (e.g., network traffic, web traffic, API traffic, etc.) associated with the server system 102 to determine additional correlations.

At 706, in the illustrated embodiment, the supplemental mitigation module 110 determines criteria and logical filters to distinguish legitimate traffic from malicious traffic. As non-limiting examples, the following is a list of logical filters that may be applied in one example embodiment: the status codes of web responses (e.g., included in outcome information 109) should be greater than 20% erroneous, the success rates of API calls should not be lower than 70% for payment or login requests, if an IP address is not leased or owned by merchant or partner, the rate of requests/API calls should not exceed five requests per second within a 1-minute frame, an IP address should not hit more than 30 endpoints in a three minute time period, the same type of request should not see more than 20 variations of payloads within a two minute period, etc.

At 708, in the illustrated embodiment, the supplemental mitigation module 110 exports new threat vector findings as a new source of internal threat intelligence. For example, in various embodiments, the new threat vectors may be used for various purposes, such as IP address scoring, context for downstream systems, campaigns attribution etc. Further, in some embodiments, this intelligence may also be used as a loopback to help us build a database of threat patterns to more accurately identify new threats. For example, at 710, in the illustrated embodiment, the new threat vectors are used to identify potentially malicious traffic. In some embodiments, these new threat vectors can be integrated with existing threat-detection rules, allowing the system to identify previously undetected threats. For example, in some embodiments, the new threat vectors may be used to identify traffic received by the server system 102 as requests 150 that are potential network attacks and, accordingly, the server system 102 may route such requests 150 to the distribution module 104, as described above. Note that, in some embodiments, the new threat vectors may also be used (e.g., as one of multiple factors) by the analytics module 114 in determining updated weightage values 124.

Example Computer System

Figure 8:
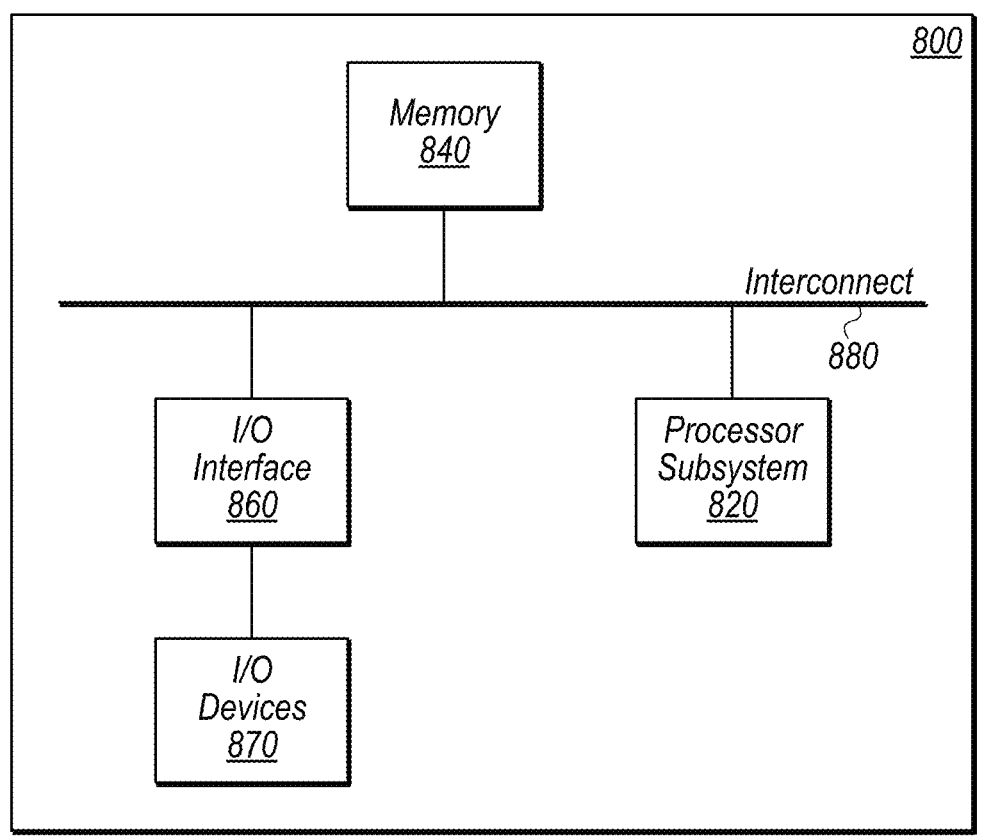
FIG. 8 is a block diagram illustrating an example computer system, according to some embodiments.

Referring now to FIG. 8, a block diagram of an example computer system 800 is depicted, which may implement one or more computer systems, such as one or more computer systems within server system 102 of FIG. 1, according to various embodiments. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause system 800 perform various operations described herein. System memory 840 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage on I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over WiFi, Bluetooth, Ethernet, etc.), and computer system 800 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—"[entity] configured to [perform one or more tasks]"—is used herein to refer to structure (i.e., something physical). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., distribution module 104, feedback module 112, analytics module 114, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method, comprising:
  receiving, by a traffic distribution module of a server system providing web-based services, a first request that has been identified as being indicative of a particular type of network attack;
  routing, by the traffic distribution module, the first request to a selected one of a plurality of different defense layers, each of the plurality of different defense layers operable to perform a different combination of one or more defensive operations, wherein each of the plurality of different defense layers corresponds to the particular type of network attack, and wherein the routing is performed based on a set of distribution weightage values, including distribution weightage values assigned to each of the plurality of different defense layers;
  receiving outcome information indicative of an effectiveness of one or more defensive operations performed, by the selected defense layer, on the first request;
  based on the outcome information, determining an updated set of distribution weightage values; and
  routing, by the traffic distribution module, subsequent requests that are identified as being indicative of the particular type of network attack based on the updated set of distribution weightage values.

2. The method of claim 1, wherein the determining the updated set of distribution weightage values includes:
  determining, based on the outcome information, that the first request was blocked by at least one of the one or more defensive operations performed by the selected defense layer; and
  generating the updated set of distribution weightage values such that a higher percentage of network traffic is routed, by the traffic distribution module, to the selected defense layer.

3. The method of claim 1, further comprising:
  adding, by the traffic distribution module, a metadata value to the first request, wherein the metadata value is used to track the first request as it is processed by the selected defense layer;
  selecting, by the selected defense layer, a particular defensive operation, of the one or more defensive operations, for the first request, wherein the selecting is performed based on at least one of the set of distribution weightage values; and updating the metadata value to further identify the selected defense layer and the particular defensive operation by which the first request is processed; and wherein the outcome information includes the updated metadata value.

4. The method of claim 1, wherein the outcome information indicates that the first request was blocked by the one or more defensive operations applied by the selected defense layer, wherein the method further comprises:

based on the outcome information, performing, by the server system, one or more additional mitigation operations.

5. The method of claim 1, wherein the plurality of different defense layers includes a first defense layer that is operable to perform a first set of one or more defensive operations; and wherein, for network traffic that is identified as being indicative of the particular type of network attack, the set of distribution weightage values includes:
an upper threshold indicating a maximum percentage of the network traffic to route to the first defense layer; and
a lower threshold indicating a minimum percentage of the network traffic to route to the first defense layer.

6. The method of claim 5, wherein the first set of one or more defensive operations includes applying a web application firewall (WAF) signature to determine whether the first request is of the particular type of network attack.

7. The method of claim 1, wherein the selected defense layer includes one or more on-premises network devices implemented within the server system.

8. The method of claim 1, wherein at least one of the plurality of different defense layers is operable to perform a combination of multiple defensive operations.

9. A non-transitory, computer-readable medium having instructions stored thereon that are executable by a server system providing web-based services to perform operations comprising:

receiving, by a traffic distribution module of the server system, a first request that has been identified as being indicative of a particular type of network attack;

routing, by the traffic distribution module, the first request to a selected one of a plurality of different defense layers, each of the plurality of different defense layers operable to perform a different combination of one or more defensive operations, wherein each of the plurality of different defense layers corresponds to the particular type of network attack, and wherein the routing is performed based on a set of distribution weightage values, including distribution weightage values assigned to each of the plurality of different defense layers;

receiving outcome information indicative of an effectiveness of one or more defensive operations performed, by the selected defense layer, on the first request;

based on the outcome information, determining an updated set of distribution weightage values; and routing, by the traffic distribution module, subsequent requests that are identified as being indicative of the particular type of network attack based on the updated set of distribution weightage values.

10. The non-transitory, computer-readable medium of claim 9, wherein the outcome information indicates that the first request was blocked by the one or more defensive operations applied by the selected defense layer, wherein the operations further comprise:

based on the outcome information, performing one or more additional mitigation operations.

11. The non-transitory, computer-readable medium of claim 10, wherein the one or more additional mitigation operations include adding, to a block list, a device fingerprint corresponding to a device that sent the first request.

12. The non-transitory, computer-readable medium of claim 9, wherein the plurality of different defense layers includes a first defense layer that is operable to perform a first set of one or more defensive operations; and wherein, for a particular type of network traffic that is identified as being indicative of the particular type of network attack, the set of distribution weightage values includes:
an upper threshold indicating a maximum percentage of the particular type of network traffic to route to the first defense layer; and
a lower threshold indicating a minimum percentage of the particular type of network traffic that is identified as being indicative of the particular type of network attack to route to the first defense layer.

13. The non-transitory, computer-readable medium of claim 9, wherein the updated set of distribution weightage values indicates:

a first percentage of the subsequent requests to route to individual ones of the plurality of different defense layers; and for a given defense layer, of the plurality of different defense layers, that provides a plurality of defensive operations, a second percentage of the subsequent requests that are routed to the given defense layer to route to individual ones of the plurality of defensive operations.

14. A method, comprising:

implementing, by a server system providing web-based services, a traffic distribution module that is operable to distribute a particular type of network traffic across a plurality of different defense layers operable to perform different combinations of one or more defensive operations, wherein the plurality of different defense layers includes:
a first defense layer that is operable to perform a first set of one or more defensive operations; and
a second defense layer that is operable to perform a second set, different from the first set, of one or more defensive operations;

receiving, by the traffic distribution module, a first plurality of requests that have been identified as indicative of the particular type of network traffic;

routing, by the traffic distribution module, the first plurality of requests across the plurality of different defense layers, wherein each of the plurality of different defense layers corresponds to the particular type of network traffic, and wherein the routing is performed based on a set of distribution weightage values, including distribution weightage values assigned to each of the first defense layer and the second defense layer;

determining an updated set of distribution weightage values based on an effectiveness of the plurality of different defense layers in mitigating the particular type of network traffic; and routing, by the traffic distribution module, a second plurality of requests identified as indicative of the particular type of network traffic across the plurality of different defense layers based on the updated set of distribution weightage values.

15. The method of claim 14, wherein the determining the updated set of distribution weightage values includes:
   determining that a first request, of the first plurality of requests, was blocked by a first one of the first set of one or more defensive operations performed by the first defense layer; and
   generating the updated set of distribution weightage values such that a higher percentage of network traffic is routed, by the traffic distribution module, to the first defensive operation provided by the first defense layer.

16. The method of claim 15, wherein the determining the updated set of distribution weightage values is further based on a particular optimization goal; and wherein at least one of the first and second sets of one or more defensive operations include applying a WAF signature.

17. The method of claim 16, wherein the particular optimization goal is to reduce a time-to-mitigation of the particular type of network traffic.

18. The method of claim 14, wherein the set of distribution weightage values indicates:
   a first percentage of the first plurality of requests to route to the first defense layer; and
   a second percentage of the first plurality of requests to route to the second defense layer; and
   wherein the method further comprises identifying the first plurality of requests as being indicative of the particular type of network traffic based on a signature associated with the particular type of network traffic.

19. The method of claim 14, wherein the determining the updated set of distribution weightage values includes:
   analyzing the effectiveness of the first and second defense layers; and
   in response to determining that the second defense layer was more effective than the first defense layer in mitigating the particular type of network traffic for the first plurality of requests, generating the updated set of distribution weightage values such that, relative to the set of distribution weightage values, a higher percentage of network traffic is routed to the second defense layer.

20. The method of claim 14, further comprising:
   receiving, by the traffic distribution module, a different plurality of requests that have been identified as indicative of a different type of network traffic than the particular type; and
   routing, by the traffic distribution module and based on the set of distribution weightage values, the different plurality of requests across a second plurality of different defense layers, wherein each of the second plurality of different defense layers corresponds to the different type of network traffic, wherein the set of distribution weightage values further includes distribution weightage values assigned to each of the second plurality of different defense layers.

* * * * *